US011891130B2

(12) United States Patent
Minakawa et al.

(10) Patent No.: US 11,891,130 B2
(45) Date of Patent: Feb. 6, 2024

(54) ELECTRIC POWER STEERING DEVICE (71) Applicant: HITACHI ASTEMO, LTD., Ibaraki (JP)

(72) Inventors: Masaaki Minakawa, Ibaraki (JP); Miki Kohso, Ibaraki (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 323 days.

(21) Appl. No.: 17/500,505

(22) Filed: Oct. 13, 2021

(65) Prior Publication Data
US 2022/0032995 A1    Feb. 3, 2022

Related U.S. Application Data (63) Continuation of application No. PCT/JP2019/022044, filed on Jun. 3, 2019.

(30) Foreign Application Priority Data

May 16, 2019   (JP) .................................. 2019-092605

(51) Int. Cl.
    *B62D 5/04*    (2006.01)
    *B62D 6/08*    (2006.01)
    *B62D 6/00*    (2006.01)

(52) U.S. Cl.
    CPC ........... *B62D 5/0463* (2013.01); *B62D 6/008* (2013.01)

(58) Field of Classification Search
    CPC ............................... B62D 5/0463; B62D 6/008
    See application file for complete search history.

(56) References Cited

U.S. PATENT DOCUMENTS

| 8,175,771 B2* | 5/2012 | Ukai | B62D 5/0481 |
| | | | 180/443 |
| 2008/0306655 A1* | 12/2008 | Ukai | B62D 5/0463 |
| | | | 701/41 |

(Continued)

FOREIGN PATENT DOCUMENTS

| JP | 2008-49963 | 3/2008 |
| JP | 2009-126244 | 6/2009 |

(Continued)

OTHER PUBLICATIONS

Office Action for JP Patent Application No. JP2019-092605, dated Jul. 2, 2019, 3 pages.

(Continued)

*Primary Examiner* — Tyler J Lee
(74) *Attorney, Agent, or Firm* — Casimir Jones, S.C.; Robert A. Goetz (57) ABSTRACT

Provided is a feature which allows an electric power steering device to improve the steering feel. The electric power steering device includes: a basic control amount calculating section configured to calculate a basic control amount corresponding to steering by a driver; a frictional force calculating section configured to calculate, by using a friction model, a frictional force corresponding to a wheel angle-related value, which is a value relating to a wheel angle of a steering device, and calculate a friction-originated control amount, which originates from the calculated frictional force; and a control amount calculating section configured to calculate a steering control amount in accordance with the basic control amount and the friction-originated control amount.

20 Claims, 7 Drawing Sheets

(56) References Cited

U.S. PATENT DOCUMENTS

2010/0228440 A1  9/2010  Yamazaki
2012/0232759 A1  9/2012  Oniwa et al.
2014/0207337 A1  7/2014  Tamaizumi

FOREIGN PATENT DOCUMENTS

JP         2014-51128     3/2014
JP         2014-136558    7/2014
WO     WO 2011/062145    5/2011

OTHER PUBLICATIONS

Office Action for JP Patent Application No. JP2019-092605, dated Oct. 15, 2019, 3 pages.
Ikuo Kushiro, et al, "Steering System for the On-center Handling" Research paper, p. 233-238, May 21, 2008, [online] URL: https://www.jstage.jst.go.jp/article/jsaeronbun/40/2/40_2_233/_pdf/-char/ja.
Written Opinion for PCT/JP2019/022044 and its English translation, International Preliminary Report on Patentability, dated Nov. 16, 2021, 8 pages.
International Search Report for PCT/JP2019/022044 and its English translation, dated Jul. 9, 2019, 1 page.

\* cited by examiner

ELECTRIC POWER STEERING DEVICE

This application is a Continuation of PCT International Application No. PCT/JP2019/022044 filed in Japan on Jun. 3, 2019, which claims the benefit of Patent Application No. 2019-092605 filed in Japan on May 16, 2019, the entire contents of which are hereby incorporated by reference.

TECHNICAL FIELD

The present invention relates to an electric power steering control device for controlling steering.

BACKGROUND ART

There have been conventionally known steering devices which assist with a steering operation by means of the revolution of an electric motor (for example, Patent Literatures 1 and 2). These steering devices control an electric current value of the motor so that a proper friction torque is applied to the steering devices in accordance with a vehicle speed or a steering angle.

CITATION LIST

Patent Literatures

[Patent Literature 1]
Japanese Patent Application Publication "Tokukai No. 2009-126244 (Publication date: Jun. 11, 2009)"
[Patent Literature 2]
PCT International Publication No. WO2011/062145 (Publication date: May 26, 2011)

SUMMARY OF INVENTION

Technical Problem

An electric power steering device preferably improves the steering feel.

It is an object of the present invention to provide a feature which allows the electric power steering device to improve the steering feel.

Solution to Problem

To achieve the object, the present invention is an electric power steering control device for calculating a steering control amount for steering a steering device, the electric power steering control device including: a basic control amount calculating section configured to calculate a basic control amount corresponding to steering by a driver; a frictional force calculating section configured to calculate, by using a friction model, a frictional force corresponding to a wheel angle-related value, which is a value relating to a wheel angle of the steering device, and calculate a friction-originated control amount, which originates from the calculated frictional force; and a control amount calculating section configured to calculate the steering control amount in accordance with the basic control amount and the friction-originated control amount calculated by the frictional force calculating section.

Advantageous Effects of Invention

The present invention allows an electric power steering device to improve the steering feel.

DESCRIPTION OF EMBODIMENTS

Embodiment 1

The following description will discuss Embodiment 1 of the present invention.

(Configuration of Vehicle 900)

Figure 1:
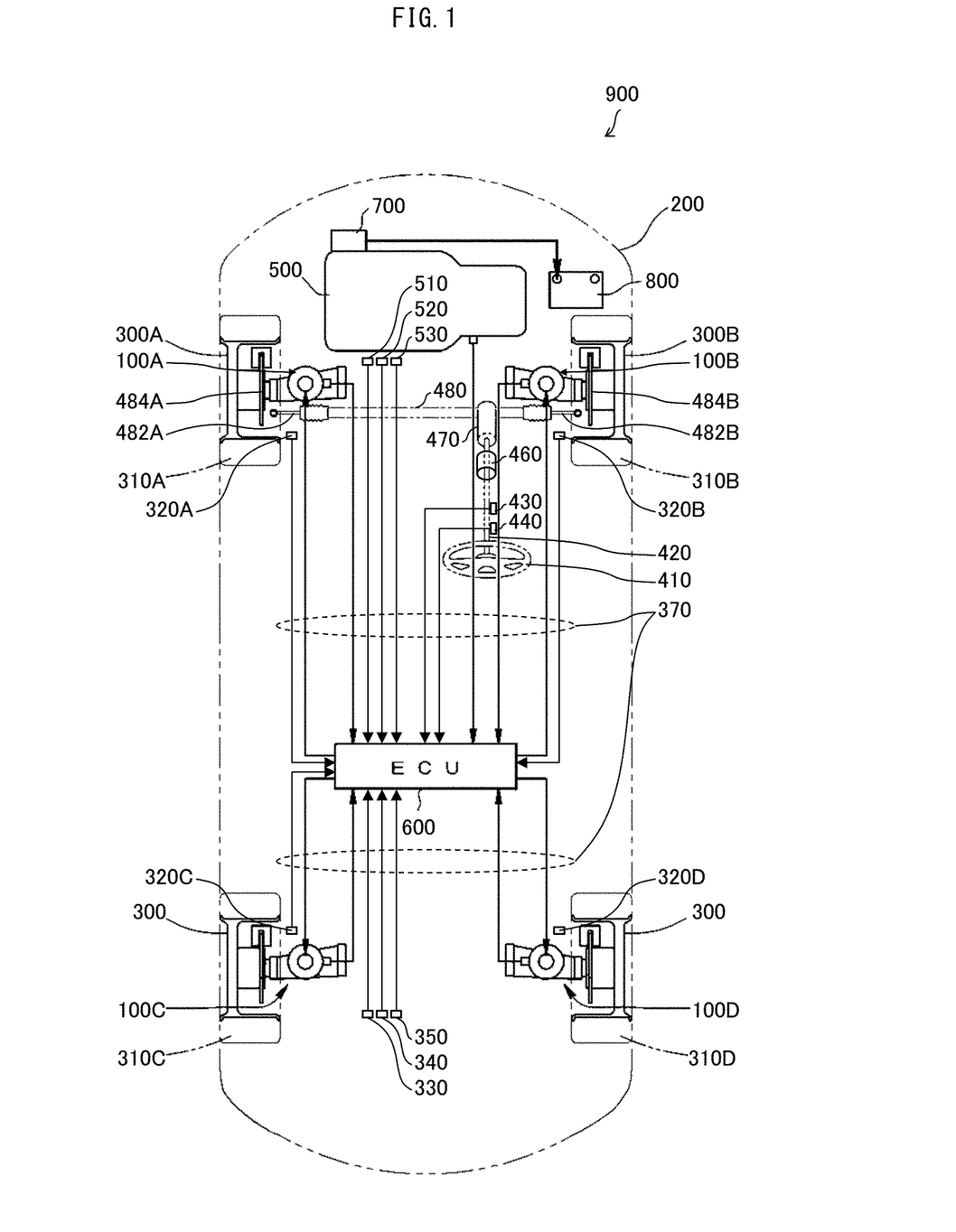
FIG. 1 is a diagram schematically illustrating a configuration of a vehicle in accordance with Embodiment 1 of the present invention.

FIG. 1 is diagram schematically illustrating a configuration of a vehicle 900 in accordance with the present embodiment. As illustrated in FIG. 1, the vehicle 900 includes suspensions 100, a vehicle body 200, wheels 300, tires 310, a steering member 410, a steering shaft 420, a torque sensor 430, a steering angle sensor 440, a torque application section 460, a rack-and-pinion mechanism 470, a rack axis 480, an engine 500, an electronic control unit (ECU) (a control device, a control section) 600, a power generator 700, and a battery 800. The suspensions 100 and the ECU 600 constitute a suspension device in accordance with the present embodiment.

The steering member 410, the steering shaft 420, the torque sensor 430, the steering angle sensor 440, the torque application section 460, the rack-and-pinion mechanism 470, the rack axis 480, and the ECU 600 constitute an electric power steering device of the present embodiment. The ECU 600 includes an electric power steering control device configured to control a steering device of the vehicle 900 by the electric power steering device.

The wheels 300 to which the tires 310 are attached are suspended on the vehicle body 200 by the suspensions 100. The vehicle 900 is a four-wheel vehicle, and includes four suspensions 100, four wheels 300, and four tires 310, accordingly.

Note that each of a left front wheel, a right front wheel, a left rear wheel, and a right rear wheel includes a tire and a wheel, which are referred to as a tire 310A and a wheel 300A, a tire 310B and a wheel 300B, a tire 310C and a wheel 300C, or a tire 310D and a wheel 300D. Similarly, respective configurations associated with the left front wheel, the right front wheel, the left rear wheel, and the right rear wheel can be denoted by signs "A", "B", "C", and The suspensions 100 each include a hydraulic shock absorber, an upper arm, and a lower arm. The hydraulic shock absorber includes, for example, a solenoid valve which is an electromagnetic valve for adjusting a damping force generated by the hydraulic shock absorber. Note, however, that the present embodiment is not limited to this. The hydraulic shock absorber may employ, as the electromagnetic valve for adjusting a damping force, an electromagnetic valve other than a solenoid valve. For example, the hydraulic shock absorber may include, as the electromagnetic valve, an electromagnetic valve that utilizes a magnetohydrodynamic flow (a magnetic fluid).

The power generator 700 is annexed to the engine 500, and electricity generated by the power generator 700 is accumulated in the battery 800.

The steering member 410, which is operated by a driver, is connected to one end of the steering shaft 420 so that a torque can be transmitted from the steering member 410 to the steering shaft 420. The other end of the steering shaft 420 is connected to the rack-and-pinion mechanism 470.

The rack-and-pinion mechanism 470 is a mechanism for converting a rotation about an axis of the steering shaft 420 into a displacement along the axial direction of the rack axis 480. When the rack axis 480 is displaced along the axial direction, the wheels 300 (300A, 300B) are steered, via respective tie rods 482 (482A, 482B) and respective knuckle bars 484 (484A, 484B).

The torque sensor 430 detects a steering torque applied to the steering shaft 420, i.e., a steering torque applied to the steering member 410, and provides, to the ECU 600, a torque sensor signal indicative of a result of the detection. More specifically, the torque sensor 430 detects a twist of a torsion bar provided inside the steering shaft 420 and outputs a result of the detection as the torque sensor signal. Note that a well-known sensor such as a Hall IC, an MR element, and a magnetostrictive torque sensor may be used as the torque sensor 430.

The steering angle sensor 440 detects a steering angle of the steering member 410, and provides a result of the detection to the ECU 600.

The torque application section 460 applies, to the steering shaft 420, an assist torque or a reaction torque corresponding to a steering control amount supplied from the ECU 600. The torque application section 460 includes (i) an assist motor 620 that generates the assist torque or the reaction torque corresponding to the steering control amount (also referred to as a motor control amount) and (ii) a torque transmission mechanism that transmits the torque generated by the assist motor 620 to the steering shaft 420. In addition, the torque application section 460 includes a motor rotation speed sensor for detecting a rotation speed of the assist motor 620, and a resolver 625 which is a motor rotation angle sensor for detecting a rotation angle of the assist motor.

Note that specific examples of the "control amount" herein encompass an electric current value, a duty ratio, a damping rate, a damping ratio, and the like.

Note that the expression "connected . . . so that a torque can be transmitted" in the above description means that one member is connected to the other member so that a rotation of the one member causes a rotation of the other member. For example, connection states indicated by the expression encompass at least (i) a state where one member and the other member are integrally molded, (ii) a state where one member is directly or indirectly fixed to the other member, and (iii) a state where one member and the other member are connected such that the one member and the other member move in conjunction with each other via a joint member or the like.

The above example discussed the steering device in which the members from the steering member 410 to the rack axis 480 are constantly and mechanically connected. However, the present embodiment is not limited to this example. The steering device in accordance with the present embodiment can be, for example, of a steer-by-wire system. The following description in the present specification is also applicable to the steering device of a steer-by-wire system.

Although FIG. 1 illustrates a so-called column-assist steering device, in which a torque application section is provided on a steering shaft, the present embodiment is not limited to this. The torque application section may be a so-called rack-assist steering device, in which a torque application section is provided on a rack axis.

The ECU 600 centrally controls electronic devices included in the vehicle 900. More specifically, the ECU 600 adjusts a steering control amount to be supplied to the torque application section 460, thereby controlling the amount of an assist torque or a reaction torque to be applied to the steering shaft 420.

Further, the ECU 600 supplies, to the solenoid valve of the hydraulic shock absorber included in each suspension 100, a suspension control amount so as to control the solenoid valve to open and close. To enable this control, an electric power line is provided for supplying driving power from the ECU 600 to the solenoid valve.

Further, the vehicle 900 includes (i) wheel speed sensors 320 that are provided for the respective wheels 300 and configured to detect wheel speeds of the respective wheels 300, (ii) a lateral G sensor 330 configured to detect a lateral acceleration of the vehicle 900, (iii) a longitudinal G sensor 340 configured to detect a longitudinal acceleration of the vehicle 900, (iv) a yaw rate sensor 350 configured to detect a yaw rate of the vehicle 900, (v) an engine torque sensor 510 configured to detect a torque generated by the engine 500, (vi) an engine speed sensor 520 configured to detect the number of revolutions of the engine 500, and (vii) a brake pressure sensor 530 configured to detect a pressure applied to a brake fluid of a braking device. Results of detections by these various sensors are supplied to the ECU 600.

Note that the vehicle 900 includes the braking device (not illustrated) capable of performing control by means of (i) an antilock brake system (ABS), which is a system for preventing the wheels from being locked during braking, (ii) a traction control system (TCS) for preventing wheelspins during, for example, acceleration, and (iii) a vehicle stability assist (VSA), which is a control system for stabilizing vehicle behavior having an automatic braking function for a yaw moment control during turning, a braking assist function, and the like.

The ABS, the TCS, and the VSA (i) compare a wheel speed determined in accordance with an estimated vehicle body speed with a wheel speed detected by the wheel speed sensor 320, and (ii) in a case where a difference between values of these two wheel speeds is not less than a predetermined value, determine the vehicle is slipping. The ABS, TCS, and VSA are intended to stabilize the behavior of the vehicle 900 by performing an optimal brake control and traction control in accordance with a running condition of the vehicle 900 through the above process.

Further, supply of the results of detection by the above various sensors to the ECU 600 and the transmission of control signals from the ECU 600 to each section are carried out via a controller area network (CAN) 370.

The signals supplied to the ECU 600 via the CAN 370 include, for example, signals indicating the following (components in the parentheses refer to signal sources).

wheel speeds of four wheels (wheel speed sensors 320A to 320D)
yaw rate (yaw rate sensor 350)
longitudinal G (longitudinal G sensor 340)
lateral G (lateral G sensor 330)
brake pressure (brake pressure sensor 530)
engine torque (engine torque sensor 510)
number of revolutions of engine (engine speed sensor 520)
steering angle (steering angle sensor 440)
steering torque (torque sensor 430)

Figure 2:
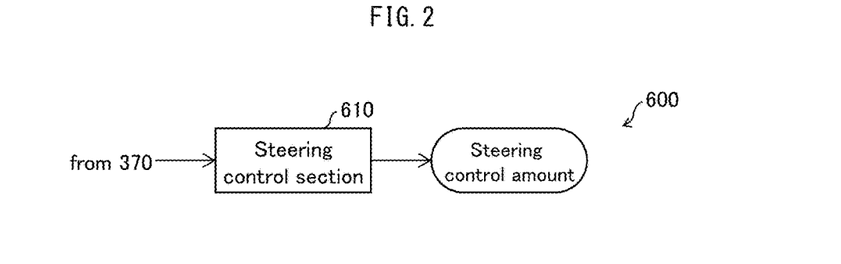
FIG. 2 is a block diagram schematically illustrating a configuration of an ECU in accordance with Embodiment 1 of the present invention.

FIG. 2 is a diagram schematically illustrating a configuration of the ECU 600.

As illustrated in FIG. 2, the ECU 600 includes a steering control section (steering control device) 610.

The steering control section 610 determines a magnitude of steering control amount to be supplied to the torque application section 460 with reference to the results of detection by the various sensors included in the CAN 370.

Note that the expression "with reference to" as used herein may mean "using", "considering", "depending on" or the like.

In addition, the process of "determining a magnitude of a control amount" includes setting a magnitude of control amount to zero, i.e., supplying no control amount.

(Steering Control Section)

Figure 3:
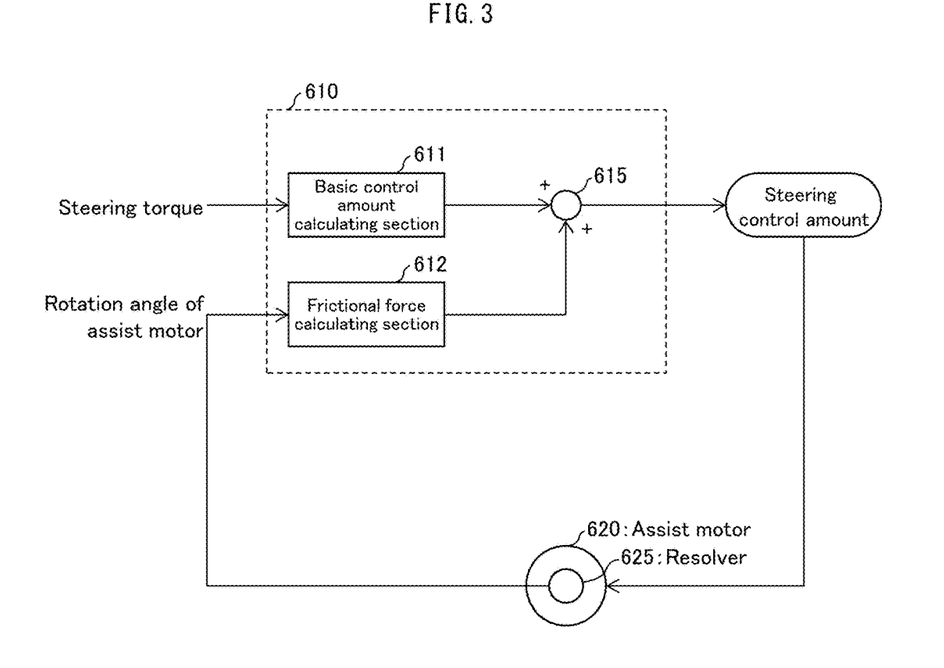
FIG. 3 is a block diagram illustrating an example configuration of a steering control section in accordance with Embodiment 1 of the present invention.

The following description will discuss the steering control section 610 more specifically with reference to FIG. 3. FIG. 3 is a block diagram illustrating an example configuration of the steering control section 610.

As illustrated in FIG. 3, the steering control section 610 includes a basic control amount calculating section 611, a frictional force calculating section 612, and an adding section 615. In the present embodiment, the basic control amount calculating section 611, the frictional force calculating section 612, and the adding section 615 are collectively referred to as a control amount calculating section for calculating a steering control amount. The control amount calculating section calculates a steering control amount in accordance with a basic control amount calculated by the basic control amount calculating section 611 and a friction-originated control amount calculated by the frictional force calculating section 612.

The basic control amount calculating section 611 calculates, with reference to the steering torque supplied by the torque sensor 430, a basic control amount which corresponds to steering by a driver and which is used to control the magnitude of an assist torque or a reaction torque. The basic control amount calculated by the basic control amount calculating section 611 is combined with the friction-originated control amount calculated by the frictional force calculating section 612, and then supplied, as a steering control amount, to the assist motor 620 of the torque application section 460.

The frictional force calculating section 612 calculates a frictional force with reference to a wheel angle-related value representing a wheel angle of the steering device. There are two kinds of wheel angle-related values: one is a steering member-side wheel angle-related value obtained by using the value associated with the steering member 410 through torsion bar provided inside the steering shaft 420, and the other is a gearbox-side wheel angle-related value obtained by using the value associated with the gearbox having the rack-and-pinion mechanism 470. The frictional force calculating section 612 uses either one of the two values to calculate a frictional force.

The frictional force can be calculated more properly by using, among other wheel angle-related values, a rotation angle of the assist motor 620, which is one of the gearbox-side wheel angle-related values that are associated with the gearbox in which much friction is generated. The assist motor 620 is an electric motor which applies an assist torque or a reaction torque to the steering device on the basis of the steering control amount.

For example, the frictional force calculating section 612 acquires, from the resolver 625, a rotation angle signal indicative of a rotation angle of the assist motor 620, and calculates, with reference to the acquired rotation angle signal, a rack position and calculate, by using a friction model, a frictional force corresponding to the calculated rack position.

The rotation angle signal which indicates the rotation angle of the assist motor 620 and which is output from the resolver 625 has high resolution. This enables the frictional force calculating section 612 to more precisely calculate a friction-originated control amount originating from a frictional force by calculating the frictional force using an output from the resolver 625 having high resolution. Further, calculating a rack displacement by using the assist motor 620 makes it possible to estimate the rack displacement more accurately in an area where the rack displacement is small.

According to the above, since a rotation angle of the assist motor 620 output from the resolver 625 is compatible with a friction model, the synergic effect brought about by using the rotation angle of the assist motor 620 and the friction model allows the frictional force calculating section 612 to more properly calculate a friction-originated control amount originating from a frictional force.

In addition, the frictional force calculating section 612 calculates a frictional force corresponding to a rack position by using a friction model which includes a spring component K and a Coulomb friction component F connected in series, and calculates a friction-originated control amount originating from the calculated frictional force.

Figure 4:
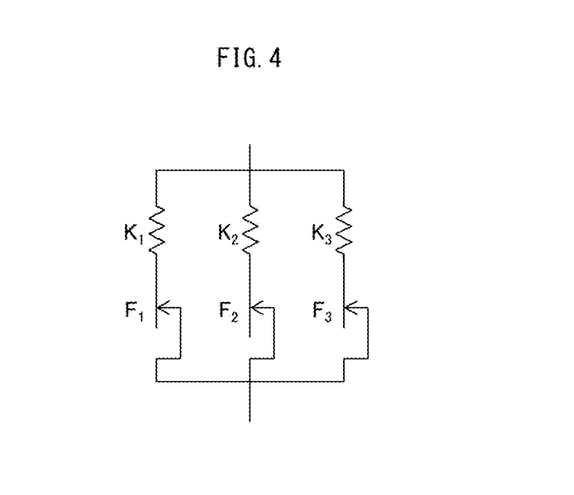
FIG. 4 is a diagram illustrating a model including a spring component and a Coulomb friction component connected in series.

FIG. 4 is a diagram illustrating an example of a model which includes the spring component K and the Coulomb friction component F connected in series and which is used by the frictional force calculating section 612 for calculation of a frictional force corresponding to a rack position. As illustrated in FIG. 4, the frictional force calculating section 612 calculates a frictional force by using a plurality of models each including the spring component K and the Coulomb friction component F connected in series. The frictional force calculating section 612 may calculate a frictional force by using, for example, the so-called Masing Model including a plurality of models which are connected together in parallel and which each include the spring component K and the Coulomb friction component F connected in series.

The frictional force calculating section 612 creates a desired frictional force waveform corresponding to the rack displacement by using the plurality of models each including the spring component K and the Coulomb friction component F connected in series, and thus calculates a frictional force corresponding to the rack position and calculates a friction-originated control amount originating from the calculated frictional force.

In FIG. 4, illustrated is an example of the Masing Model constituted by three models connected in parallel, which are: a model including a spring component $K_1$ and a Coulomb friction component $F_1$ connected in series; a model including a spring component $K_2$ and a Coulomb friction component $F_2$ connected in series; and a model including a spring component $K_2$ and a Coulomb friction component $F_3$ connected in series. The number of the models connected is not limited to this example, and the frictional force calculating section 612 may calculate a frictional force using the models in a larger number, for example, 10 or more.

The plurality of models has respective different ratios which are a ratio between the spring constant of the spring component $K_1$ and the Coulomb friction force of the Coulomb friction component $F_1$, a ratio between the spring constant of the spring component $K_2$ and the Coulomb friction force of the Coulomb friction component $F_2$, and a ratio between the spring constant of the spring component $K_3$ and the Coulomb friction force of the Coulomb friction component $F_3$. The ratios of the models, $F_1/K_1$, $F_2/K_2$, and $F_3/K_3$, between the respective spring constants and the respective Coulomb friction forces are set to be in a relationship of, for example, $F_1/K_1 < F_2/K_2 < F_3/K_3$. The ratios of the models, $F_1/K_1$, $F_2/K_2$, and $F_3/K_3$, between the respective spring constants and the respective Coulomb friction forces may be arbitrarily set in consideration of ideal waveforms of frictional force to be output by driving these models. The frictional force calculating section 612 outputs, to the adding section 615 as a friction-originated control amount in accordance with the rack position, an electric current proportional to the frictional force signal to be output by driving the models including the respective spring components $K_1$ to $K_3$ and the respective Coulomb friction components $F_1$ to $F_3$ connected in series.

Figure 5:
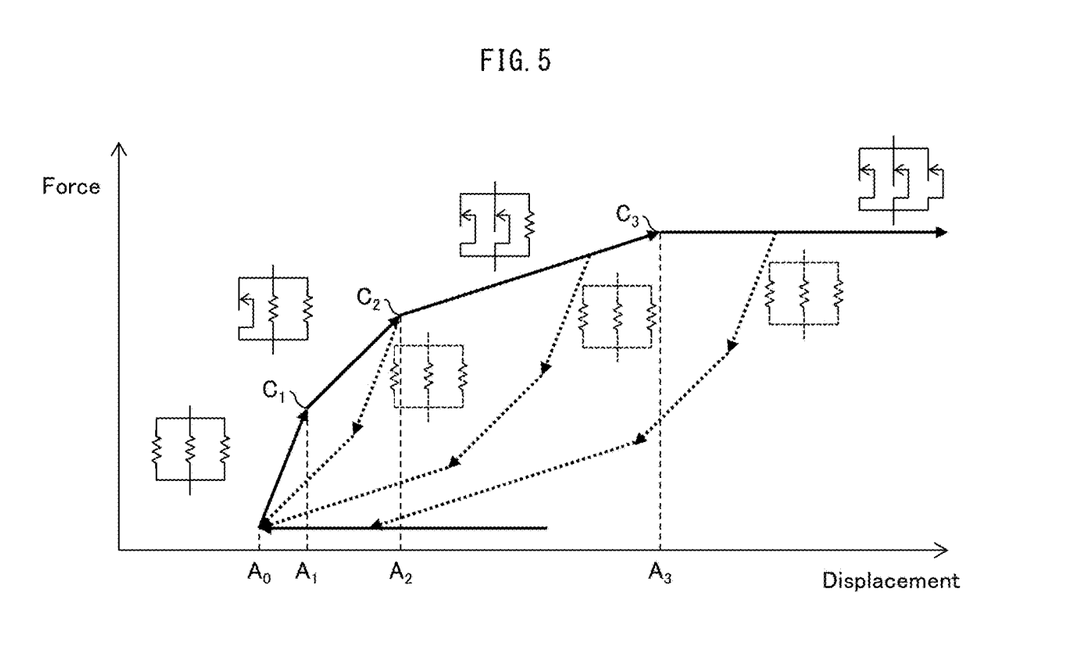
FIG. 5 is a diagram illustrating a steering control amount calculated in the steering control section in accordance with Embodiment 1 of the present invention.

FIG. 5 is a diagram illustrating frictional force waveforms created using the models including the respective spring components $K_1$ to $K_3$ and the respective Coulomb friction components $F_1$ to $F_3$ connected in series. As illustrated in FIG. 5, the frictional force calculating section 612 fixes all models of Coulomb friction components when the rack position is between a rack position $A_0$, which is a rack position immediately after the steering member 410 is reversed, and a rack position $A_1$. This achieves a frictional force waveform representing an increase in the frictional force from $C_0$ to $C_1$. The increase in the frictional force from $C_0$ to $C_1$ has a steeper gradient than an increase from $C_1$ to $C_2$ and an increase from $C_2$ to $C_3$ (which are described later).

Subsequently, when the rack positon is between the rack position $A_1$ and the rack position $A_2$, the frictional force calculating section 612 slides a model which includes the spring component $K_1$ and the Coulomb friction component $F_1$ connected in series and which has the lowest ratio between the spring constant and the Coulomb friction force of the three models. This achieves a frictional force waveform representing an increase in the frictional force from $C_1$ to $C_2$ having a gentler gradient than the increase from $C_0$ to $C_1$.

Next, when the rack positon is between the rack position $A_2$ and the rack position $A_3$, the frictional force calculating section 612 slides a model which includes the spring component $K_1$ and the Coulomb friction component $F_1$ connected in series and which has the lowest ratio between the spring constant and the Coulomb friction force of the three models, and a model which includes the spring component $K_2$ and the Coulomb friction component $F_2$ connected in series and which has the second lowest ratio between the spring constant and the Coulomb friction force of the three models. This achieves a frictional force waveform representing an increase in the frictional force from $C_2$ to $C_3$ having even gentler gradient than the increase from $C_1$ to $C_2$.

Finally, the frictional force calculating section 612 slides all the plurality of models including the respective spring components $K_1$ to $K_3$ and the respective Coulomb friction components $F_1$ to $F_3$ connected in series. This makes it possible to keep the frictional force at a constant value $C_3$.

In this manner, the frictional force calculating section 612 achieves a frictional force waveform representing a gently increasing frictional force by sliding the plurality of models, each including the spring component K and the Coulomb friction component F connected in series, in ascending order of the ratio between the spring constant and the Coulomb friction force. In addition, it is possible to create a frictional force waveform representing the frictional force increasing even more smoothly by causing the frictional force calculating section 612 to use a greater number of the models which each include the spring component K and the Coulomb friction component F connected in series.

In a case where the frictional force is calculated by using such a plurality of models each including the spring component K and the Coulomb friction component F connected in series, a frictional force waveform follows a path having point symmetry in terms of outward and return movements of the steering member 410, and goes to the previous reversal point. This allows the frictional force calculating section 612 to achieve an ideal frictional force waveform without detecting whether the steering member 410 is in the outward movement or in the return movement by using a plurality of models each including the spring component K and the Coulomb friction component F connected in series.

Values calculated by the frictional force calculating section 612 using the above models exhibit hysteresis in terms of the relationship between the steering angle-related value and the friction-originated control amount. The frictional force calculating section 612 may be provided, in advance, with a hysteresis map indicating the relationship between the steering angle-related value and the friction-originated control amount that have been calculated in advance by using the above models. The frictional force calculating section 612 may calculate a friction-originated control amount by using an acquired steering angle-related value and the hysteresis map.

Further, it is possible for the frictional force calculating section 612 to calculate a frictional force by using a friction model other than the Masing Model as described above. Examples of a friction model other than the Masing Mode include the Maxwell model, the Dahl model, and the Lugre model, and a model created by combining different friction models may be used. The Maxwell model enables calculation of a frictional force through the serial connection of a stiffness component and a damping component. Use of these friction models allows designers to create desired waveforms with flexibility.

The adding section 615 calculates a steering control amount by adding the friction-originated control amount calculated by the frictional force calculating section 612 to the basic control amount calculated by the basic control amount calculating section 611. The steering control amount calculated by the adding section 615 is supplied to the assist motor 620 of the torque application section 460.

Figure 6A:
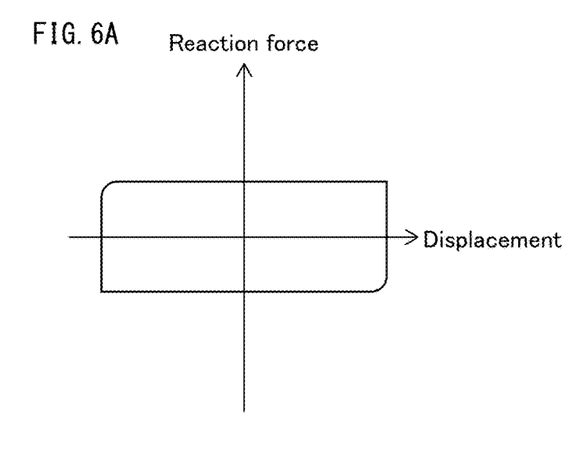
FIG. 6A is a diagram illustrating a steering reaction force in a case where steering control is performed by using only a basic control amount.

FIG. 6A is a diagram illustrating a steering reaction force in a case where steering control is performed by using only the basic control amount calculated by the basic control amount calculating section 611.

Figure 6B:
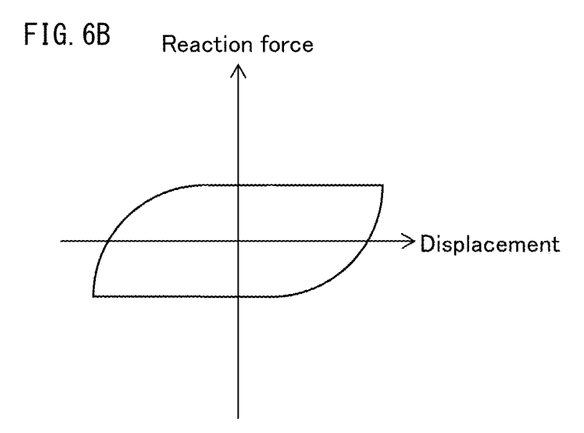
FIG. 6B is a diagram illustrating a steering reaction force in a case where steering control is performed by using only a friction-originated control amount.

FIG. 6B is a diagram illustrating a steering reaction force in a case where steering control is performed by using only the friction-originated control amount calculated by the frictional force calculating section 612.

Figure 6C:
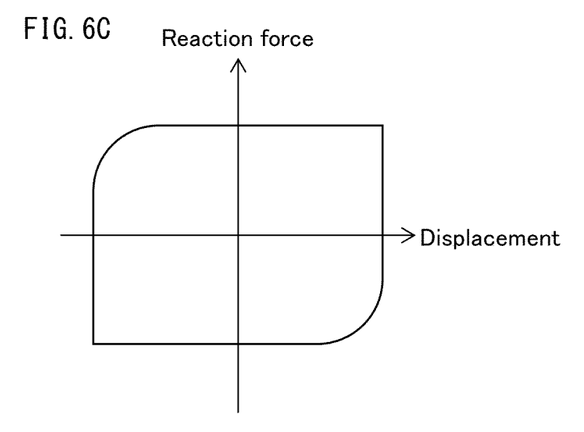
FIG. 6C is a diagram illustrating a steering reaction force in a case where steering control is performed by using a steering control amount calculated by an adding section.

FIG. 6C is a diagram illustrating a steering reaction force in a case where steering control is performed by using the steering control amount calculated by the adding section 615.

The steering control section 610 thus controls the steering device by means of the steering control amount, which is obtained by adding, to the basic control amount calculated by the basic control amount calculating section 611, the friction-originated control amount, which originates from the frictional force and which is calculated by the frictional force calculating section 612 by using a plurality of models each including the spring component K and the Coulomb friction component F connected in series. Such control enables a smooth rise of a frictional force in the initial stage of steering, and thus facilitates a fine steering operation. Further, the control produces a clear change in steering force even for a subtle change in a steering angle, and thus allows perception of the subtle change in the steering angle through the sense of touch. This improves the steering feel.

Embodiment 2

Figure 7:
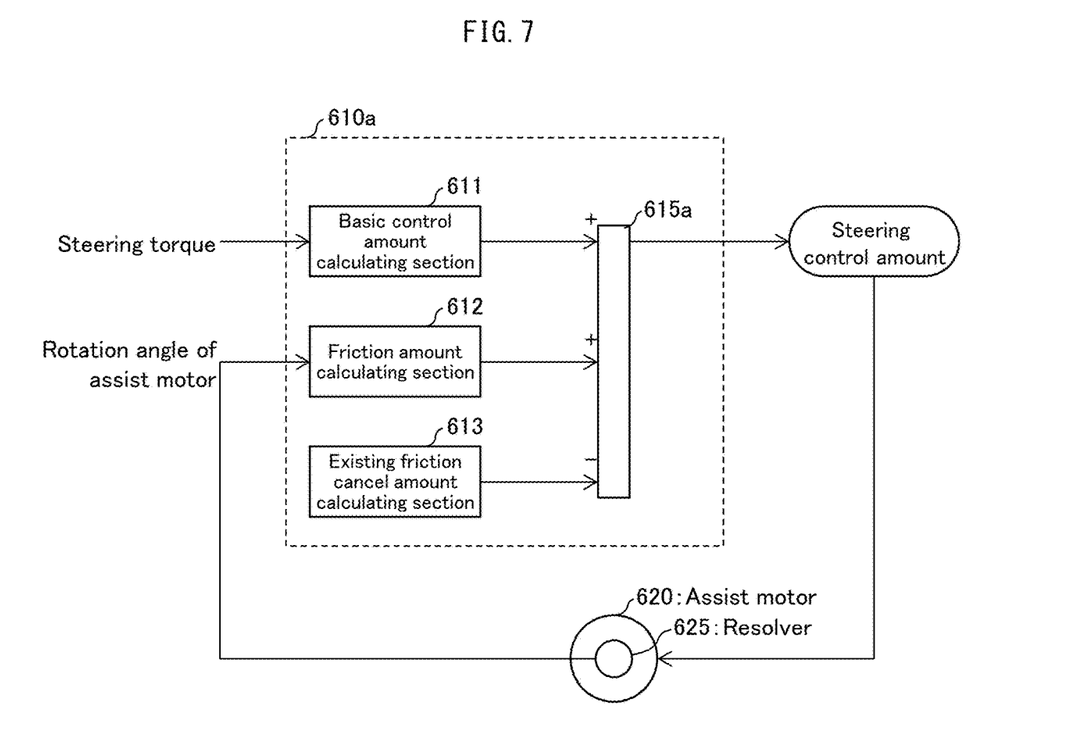
FIG. 7 is a block diagram illustrating an example configuration of a steering control section in accordance with Embodiment 2 of the present invention.

Although the steering control section 610 is configured, by way of example in Embodiment 1, to calculate a steering control amount in accordance with the basic control amount corresponding to a steering amount and the friction-originated control amount calculated by the frictional force calculating section 612, the invention described in the present specification is not limited to this. A steering control section 610a in Embodiment 2 further includes, in addition to the configuration of Embodiment 1, an existing friction cancel amount calculating section 613 which calculates a friction cancel control amount by which the friction generated in the electric power steering device is cancelled. The steering control section 610a calculates a steering control amount in accordance with the basic control amount, the friction-originated control amount, and the friction cancel control amount calculated by the existing friction cancel amount calculating section 613. For the convenience of description, a member having a function identical to that of a member described in the above embodiment is given an identical reference sign, and the description thereof is omitted.

FIG. 7 is a block diagram illustrating an example configuration of the steering control section 610a in accordance with the present embodiment.

As illustrated in FIG. 9, the steering control section 610a differs from the steering control section 610 described in Embodiment 1 in the following respect.

Specifically, the steering control section 610a includes the existing friction cancel amount calculating section 613. In the present embodiment, the basic control amount calculating section 611, the frictional force calculating section 612, the existing friction cancel amount calculating section 613, and a computing section 615a are collectively referred to as a control amount calculating section.

The existing friction cancel amount calculating section 613 calculates an amount of friction generated in the steering device, that is, a friction amount corresponding to the existing friction characteristics of machine parts such as the steering member 410, the steering shaft 420, the torque application section 460, the rack-and-pinion mechanism 470, and the rack axis 480.

The existing friction cancel amount calculating section 613 calculates an existing friction amount in accordance with at least one of (i) the steering angle of the steering member 410 detected by the steering angle sensor 440 and (ii) the steering torque which is detected by the torque sensor 430 and which is generated in the steering member 410 when the steering device is steered.

When a steering angle is used to calculate an existing friction amount, the steering angle may be calculated by using the motor rotation angle calculated by the resolver 625 and the steering torque detected by the torque sensor 430. Specifically, the steering angle can be obtained by adding, to the motor rotation angle, a correction angle calculated on the basis of the steering torque. In this case, the correction angle calculated on the basis of the steering torque can be calculated by multiplying the detected steering torque by a predetermined coefficient (for example, the reciprocal of the spring rate of the torsion bar). This makes it possible to accurately determine the steering angle to calculate the existing friction amount, even when the steering angle sensor 440 is not included.

The existing friction cancel amount calculating section 613 calculates, on the basis of the calculated existing friction amount, a friction cancel control amount used to subtract (cancel) the existing friction amount from the final steering control amount.

The computing section 615a calculates a steering control amount by subtracting, from a result of adding the basic control amount and the friction-originated control amount, the friction cancel control amount calculated by the existing friction cancel amount calculating section 613. The steering control amount calculated by the computing section 615a is supplied to the assist motor 620 of the torque application section 460.

Figure 8A:
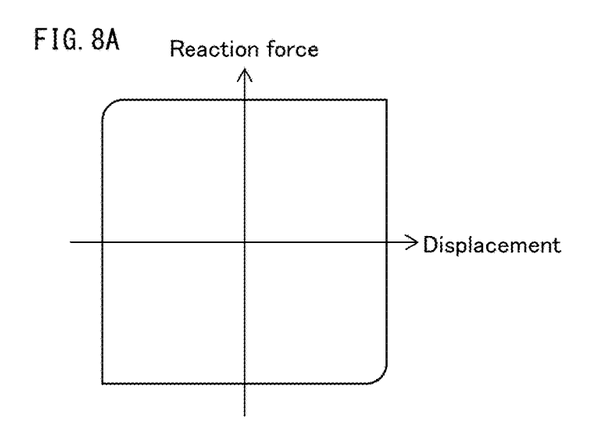
FIG. 8A is a diagram illustrating a steering reaction force in a case where steering control is performed by using only a basic control amount.

FIG. 8A is a diagram illustrating a steering reaction force in a case where steering control is performed by using only the basic control amount calculated by the basic control amount calculating section 611.

Figure 8B:
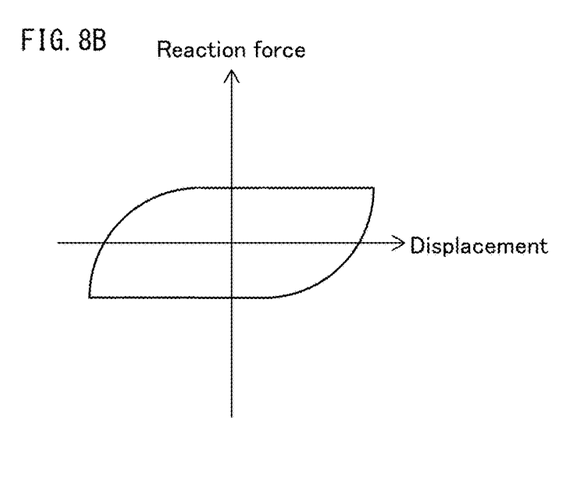
FIG. 8B is a diagram illustrating a steering reaction force in a case where steering control is performed by using a steering control amount calculated by a computing section.

FIG. 8B is a diagram illustrating a steering reaction force in a case where steering control is performed by using the steering control amount calculated by the computing section 615a.

According to the above feature, the steering control section 610a calculates a steering control amount by subtracting the friction cancel control amount from a result of adding the basic control amount and the friction-originated control amount. This allows the steering control section 610a to calculate a desired steering control amount corresponding to the friction characteristics of the machine parts of the electric power steering device.

Embodiment 3

Figure 9:
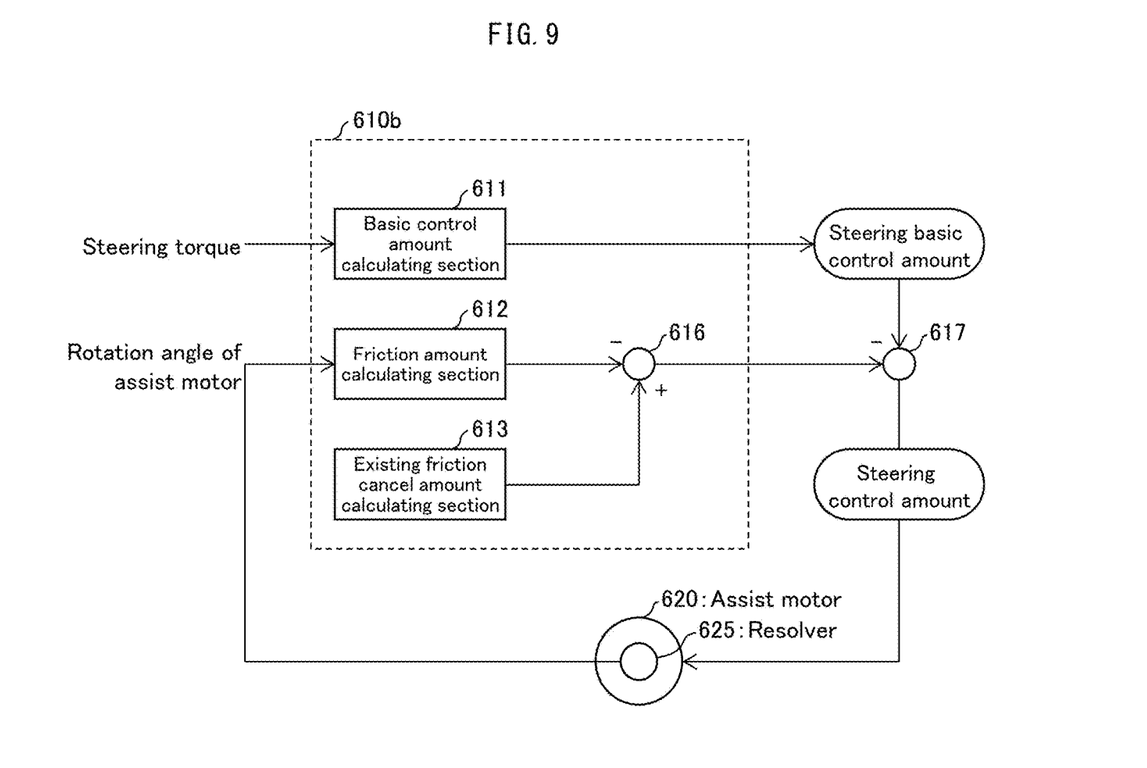
FIG. 9 is a block diagram illustrating an example configuration of a steering control section in accordance with Embodiment 3 of the present invention.

Although the steering control section 610a is configured, by way of example in Embodiment 2, to calculate a steering control amount by subtracting the friction cancel control amount from a result of adding the basic control amount and the friction-originated control amount, the invention described in the present specification is not limited to this. In comparison with the configuration of Embodiment 2, the steering control section 610b in Embodiment 3 includes a computing section (correction control amount calculating section) 616 instead of the computing section 615a. The steering control section 610b outputs (i) the basic control amount calculated by the basic control amount calculating section 611, and (ii) a correction control amount obtained by subtracting the friction-originated control amount from the friction cancel control amount. For the convenience of description, a member having a function identical to that of a member described in Embodiment 1 or 2 described above is given an identical reference sign, and the description thereof is omitted.

FIG. 9 is a block diagram illustrating an example configuration of a steering control section 610b in accordance with the present embodiment.

As illustrated in FIG. 9, the steering control section 610b differs from the steering control section 610a described in Embodiment 2 in the following respect.

Specifically, the steering control section 610b does not include the computing section 615a but includes the computing section 616.

The computing section 616 calculates a correction control amount by subtracting, from the friction cancel control amount calculated by the existing friction cancel amount calculating section 613, the friction-originated control amount calculated by the frictional force calculating section 612.

The correction control amount calculated by the computing section 616 is subtracted, in the subtracting section 617, from the basic control amount calculated by the basic control amount calculating section 611.

In the present embodiment, the basic control amount calculating section 611, the frictional force calculating section 612, the existing friction cancel amount calculating section 613, the computing section 616, and the subtracting section 617 are collectively referred to as a control amount calculating section. The control amount calculating section calculates a steering control amount by subtracting the correction control amount from the basic control amount.

Figure 10:
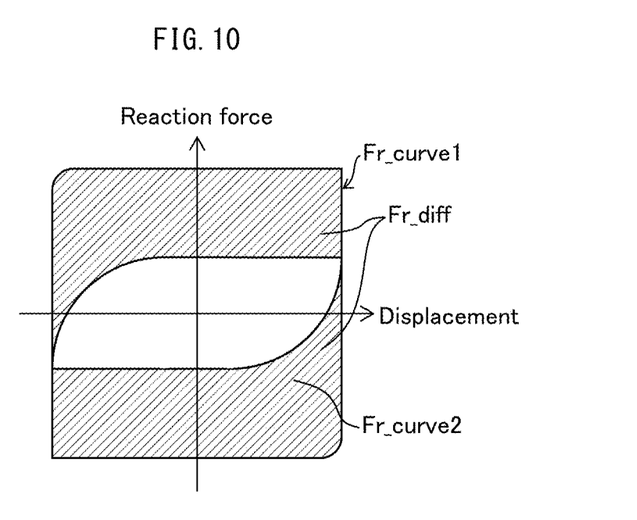
FIG. 10 is a diagram illustrating a steering control amount calculated in the steering control section in accordance with Embodiment 3 of the present invention.

FIG. 10 is a diagram illustrating a waveform of the steering control amount calculated by the control amount calculating section. In FIG. 10, Fr_curve 1 represents a waveform of a steering reaction force in a case where steering control is performed by using the basic control amount calculated by the basic control amount calculating section 611, and Fr_curve 2 represents a waveform of a steering reaction force in a case where steering control is performed by using an ideal steering control amount. Fr_diff represents a difference between the ideal steering reaction force and the steering reaction force in a case of using the basic control amount.

The correction control amount calculated by the computing section 616 through subtraction of the friction-originated control amount from the friction cancel control amount corresponds to Fr_diff. As illustrated in FIG. 10, the control amount calculating section calculates a desired steering control amount (corresponding to Fr_curve 2) by subtracting, from the basic control amount (corresponding to Fr_curve 1) calculated by the basic control amount calculating section 611, the correction control amount (corresponding to Fr_diff) calculated by the computing section 616.

The control amount calculating section supplies the calculated steering control amount to the assist motor 620 of the torque application section 460.

With these features, the control amount calculating section calculates a correction control amount by subtracting the friction-originated control amount from the friction cancel control amount from the basic control amount, and calculates a steering control amount by subtracting the calculated correction control amount from the basic control amount. This makes it possible not only to make the rise of a frictional force smooth but also to prevent oscillation disturbance from affecting calculation of the steering control amount. This enables perception of a subtle change in a steering angle through the sense of touch even in a case of the repeated steering operations of subtle turning and turning-back, improving the steering feel.

Embodiment 4

The following description of Embodiment 4 will discuss a feature which improves the steering feel, additionally by increasing the flexibility of the friction portions of the machine parts of the electric power steering device as described in Embodiments 1, 2, and 3 described above. The feature of Embodiment 4 can be applied to any of Embodiments 1, 2, and 3.

Figure 11:
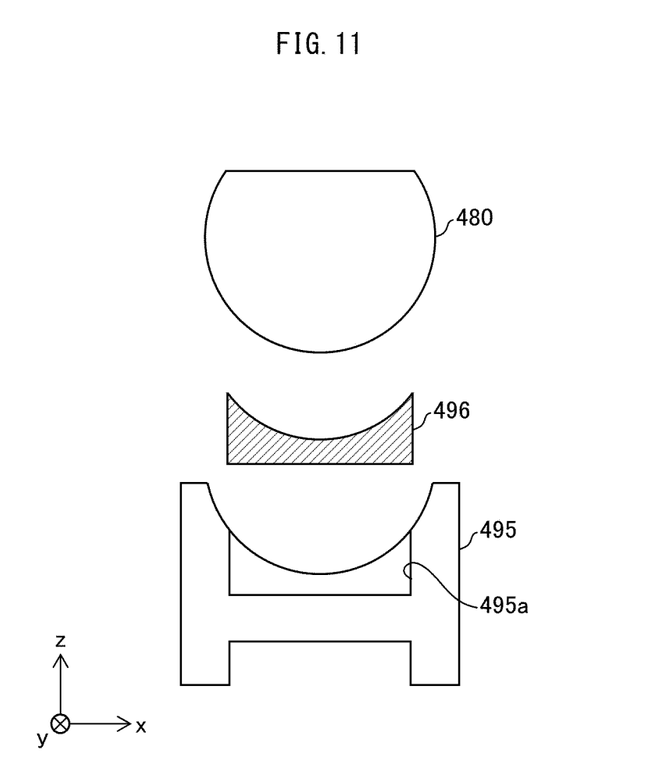
FIG. 11 is a diagram illustrating friction portions of machine parts in accordance with Embodiment 4 of the present invention.

FIG. 11 is a diagram illustrating the rack axis 480 and a rack guide 495, which are examples of friction portions of the machine parts of the electric power steering device. As illustrated in FIG. 11, a resin bearing 496 is provided between the rack axis 480 and the rack guide 495. The rack guide 495 has a recess 495a formed along the direction in which the rack axis extends, and the resin bearing 496 is fitted to the recess.

In FIG. 11, a y-axis direction indicates a direction in which the rack axis 480 extends, a z-axis, which is perpendicular to the y axis, indicates the vertical direction, and an x axis indicates a direction perpendicular to the y and z axes.

As illustrated in FIG. 11, a thickness (thickness along the z-axis direction) of the resin bearing 496 is increased to increase flexibility of the resin bearing 496. This allows distortion of the resin bearing 496 to yield a smooth rise of a frictional force at a time when the rack axis 480 starts sliding against the reactive torque.

In addition, it is preferable to vary a thickness (the thickness along the z-axis direction) of the resin bearing 496 along the x-axis direction as illustrated in FIG. 11. This makes it possible to vary, depending on positions in the resin bearing 496, amount of distortion caused until the rack axis starts sliding against the reactive torque, and thus makes the rise of a frictional force smoothly-curved, not stepped.

It is possible to make smooth the rise of a frictional force in the electric power steering device caused by a steering operation, by increasing a thickness of a resin bearing and, in addition, making the thickness uneven, not only in the friction portions of the rack axis 480 and the rack guide 495 but also in the friction portions of various machine parts of the electric power steering device. This enables improvement of the steering feel.

Software Implementation Example

Control blocks of the ECU 600 (steering control section 610) can be realized by a logic circuit (hardware) provided in an integrated circuit (IC chip) or the like or can be alternatively realized by software as executed by a central processing unit (CPU).

In the latter case, the ECU 600 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be made available to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

410 steering member
420 steering shaft
430 torque sensor
440 steering angle sensor
460 torque application section
600 ECU
610, 610*a*, 610*b* steering control section (steering control device)
611 basic control amount calculating section
612 friction amount calculating section
612 frictional force calculating section
613 existing friction cancel amount calculating section
616 computing section (correction control amount calculating section)
617 subtracting section
620 assist motor
625 resolver
F, F1, F2, F3 Coulomb friction component
K, K1, K2, K3 spring component

The invention claimed is:

1. An electric power steering control device for calculating a steering control amount for steering a steering device, the electric power steering control device, comprising:
   a basic control amount calculating section configured to calculate a basic control amount corresponding to steering by a driver;
   a frictional force calculating section configured to calculate, by using a friction model, a frictional force corresponding to a wheel angle-related value, which is a value relating to a wheel angle of the steering device, and calculate a friction-originated control amount, which originates from the calculated frictional force; and
   a control amount calculating section configured to calculate the steering control amount in accordance with the basic control amount and the friction-originated control amount calculated by the frictional force calculating section,
   the friction model being a model including a spring component and a Coulomb friction component connected in series,
   the frictional force calculating section being configured to:
   calculate the frictional force by using a plurality of models each being the model including the spring component and the Coulomb friction component connected in series,
   the plurality of models having respective spring constants and respective Coulomb friction forces,
   the plurality of models having respective ratios between the respective Coulomb friction forces and the respective spring constants, the ratios being different from each other; and
   output, in accordance with the wheel angle-related value, the frictional force which is to be output by driving the plurality of models, by sliding the plurality of models in ascending order of the ratios.

2. The electric power steering control device according to claim 1, wherein
   the wheel angle-related value is calculated from a signal indicating a motor rotation angle of an electric motor, which is configured to apply, to the steering device, an assist torque or a reaction torque on a basis of the steering control amount calculated by the control amount calculating section.

3. The electric power steering control device according to claim 2, further comprising
   an existing friction cancel amount calculating section configured to calculate a friction cancel control amount for cancelling friction generated in the steering device, wherein
   the control amount calculating section is configured to calculate the steering control amount in accordance with the basic control amount, the friction-originated control amount, and the friction cancel control amount.

4. The electric power steering control device according to claim 3, wherein
   the control amount calculating section is configured to calculate the steering control amount by subtracting the friction cancel control amount from a result of adding the basic control amount and the friction-originated control amount.

5. The electric power steering control device according to claim 3, wherein
   the control amount calculating section is configured to calculate a correction control amount by subtracting the friction-originated control amount from the friction cancel control amount, and calculate the steering control amount by subtracting the correction control amount from the basic control amount.

6. The electric power steering control device according to claim 3, wherein
   the existing friction cancel amount calculating section is configured to calculate the friction cancel control amount in accordance with a steering torque generated when the steering device is steered.

7. An electric power steering device, comprising an electric power steering control device according to claim 3.

8. An electric power steering device, comprising an electric power steering control device according to claim 4.

9. An electric power steering device, comprising an electric power steering control device according to claim 5.

10. An electric power steering device, comprising an electric power steering control device according to claim 6.

11. An electric power steering device, comprising an electric power steering control device according to claim 2.

12. The electric power steering control device according to claim 1, further comprising
an existing friction cancel amount calculating section configured to calculate a friction cancel control amount for cancelling friction generated in the steering device, wherein
the control amount calculating section is configured to calculate the steering control amount in accordance with the basic control amount, the friction-originated control amount, and the friction cancel control amount.

13. The electric power steering control device according to claim 12, wherein
the control amount calculating section is configured to calculate the steering control amount by subtracting the friction cancel control amount from a result of adding the basic control amount and the friction-originated control amount.

14. The electric power steering control device according to claim 12, wherein
the control amount calculating section is configured to calculate a correction control amount by subtracting the friction-originated control amount from the friction cancel control amount, and calculate the steering control amount by subtracting the correction control amount from the basic control amount.

15. The electric power steering control device according to claim 12, wherein
the existing friction cancel amount calculating section is configured to calculate the friction cancel control amount in accordance with a steering torque generated when the steering device is steered.

16. An electric power steering device, comprising an electric power steering control device according to claim 12.

17. An electric power steering device, comprising an electric power steering control device according to claim 13.

18. An electric power steering device, comprising an electric power steering control device according to claim 14.

19. An electric power steering device, comprising an electric power steering control device according to claim 15.

20. An electric power steering device, comprising an electric power steering control device according to claim 1.

* * * * *